US010962721B2

(12) United States Patent
Lin et al.

(10) Patent No.: US 10,962,721 B2
(45) Date of Patent: Mar. 30, 2021

(54) ADIABATIC OPTICAL COUPLER FOR DIRECT SOI TO INTERPOSER COUPLING

(71) Applicant: FINISAR CORPORATION, Sunnyvale, CA (US)

(72) Inventors: Shiyun Lin, San Diego, CA (US); Daniel Mahgerefteh, Los Angeles, CA (US)

(73) Assignee: II-VI DELAWARE, INC., Wilmington, DE (US)

(*) Notice: Subject to any disclaimer, the term of this patent is extended or adjusted under 35 U.S.C. 154(b) by 0 days.

(21) Appl. No.: 16/547,252

(22) Filed: Aug. 21, 2019

(65) Prior Publication Data
US 2020/0064554 A1 Feb. 27, 2020

Related U.S. Application Data

(60) Provisional application No. 62/720,714, filed on Aug. 21, 2018.

(51) Int. Cl.
G02B 6/30 (2006.01)
G02B 6/34 (2006.01)
G02B 6/122 (2006.01)

(52) U.S. Cl.
CPC ........... G02B 6/305 (2013.01); G02B 6/1228 (2013.01); G02B 6/34 (2013.01)

(58) Field of Classification Search
None
See application file for complete search history.

(56) References Cited

U.S. PATENT DOCUMENTS

2016/0306117 A1* 10/2016 Middlebrook ....... G02B 6/1221

* cited by examiner

Primary Examiner — Jerry Rahll
(74) Attorney, Agent, or Firm — Blank Rome LLP

(57) ABSTRACT

An adiabatic optical coupler can include: a top tapered region that includes a top taper having two top tapered sides that taper from a first end region to a top tip region, the top taper having a first length; and a bottom tapered region under the top tapered region, wherein the bottom tapered region includes a bottom taper having two bottom tapered sides that taper from the first end region to a bottom tip region, the bottom taper having a second length that is longer than the first length. Another adiabatic optical coupler can include: a tapered region that includes a taper having two tapered sides that taper from an end region to a tip region; and a sub-wavelength grating (SWG) optically coupled with the tip region. Another adiabatic optical coupler can include a combination of these two adiabatic optical couplers.

33 Claims, 12 Drawing Sheets

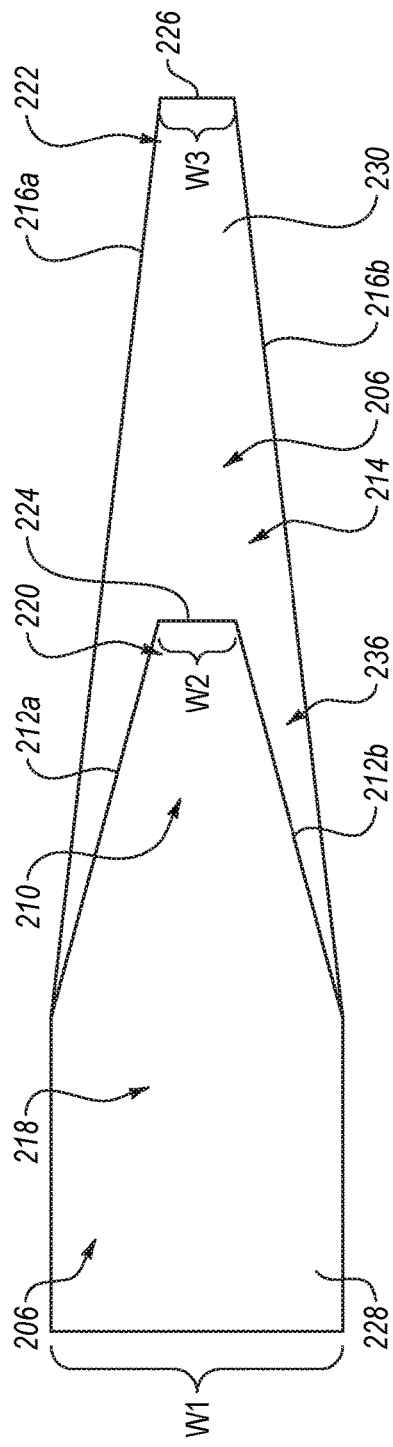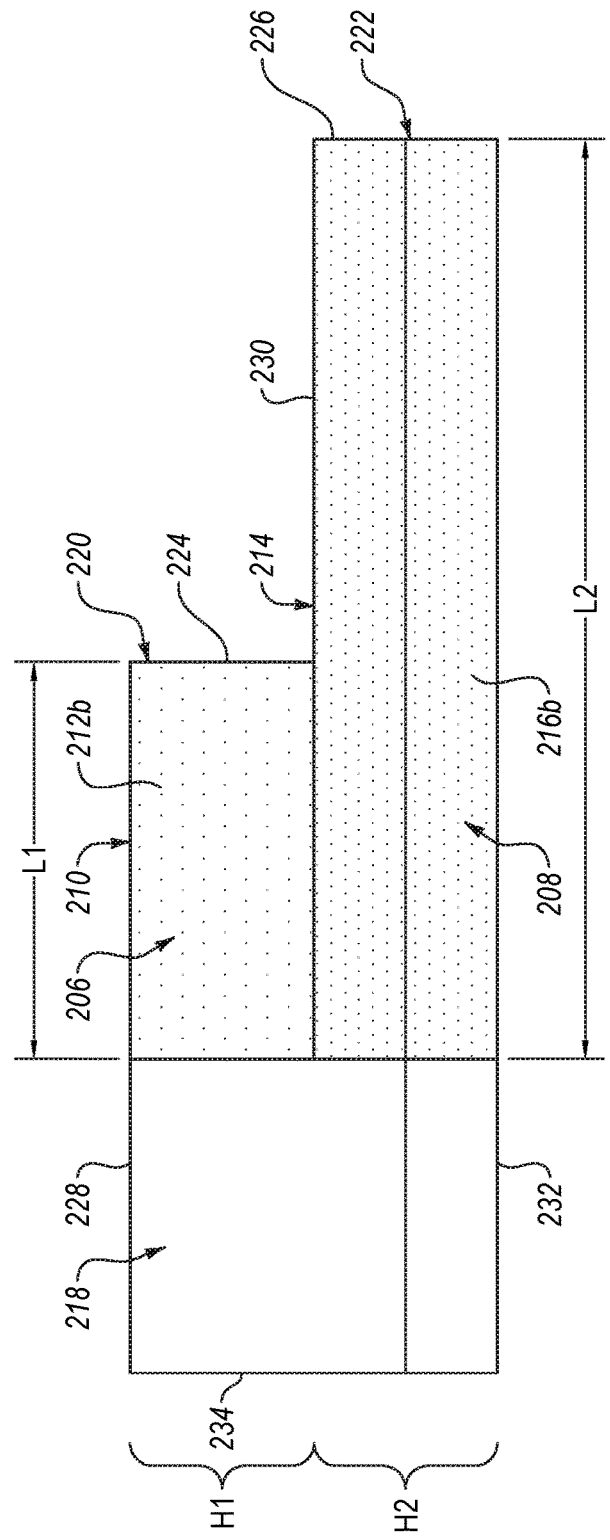
FIG. 3A
FIG. 3B

ADIABATIC OPTICAL COUPLER FOR DIRECT SOI TO INTERPOSER COUPLING

CROSS-REFERENCE

This patent application claims priority to U.S. Provisional Application No. 62/720,714 filed Aug. 21, 2018, which provisional is incorporated herein by specific reference in its entirety.

BACKGROUND

Field

The present disclosure relates to an adiabatic optical coupler. More particularly, the present disclosure relates to an different embodiments of adiabatic optical couplers that can efficiently couple light into an interposer.

Description of Related Art

Previously, coupling light from a waveguide into an interposer waveguide used a silicon nitride layer to bridge the waveguide to the interposer waveguide. However, fabrication of the silicon nitride layer can be complicated and problematic. The manufacturing protocol requires unique fabrication techniques when installing the silicon nitride layer between the waveguide and interposer waveguide. Also, the use of the silicon nitride layer resulted in increased costs.

Therefore, it would be advantageous to have an optical system that omitted the silicon nitride coupler between the waveguide and interposer waveguide.

SUMMARY

In some embodiments, an adiabatic optical coupler can include: a top tapered region that includes a top taper having two top tapered sides that taper from a first end region to a top tip region, the top taper having a first length; and a bottom tapered region under the top tapered region, wherein the bottom tapered region includes a bottom taper having two bottom tapered sides that taper from the first end region to a bottom tip region, the bottom taper having a second length that is longer than the first length. In some aspects, the top tapered region is integrated with the bottom tapered region as a unitary optically transmissive body. In some aspects, the top tapered region is a body coupled with a body the bottom tapered region. In some aspects, the adiabatic optical coupler includes: a first stage that includes the top tapered region and bottom tapered region that extends from the first end region to about the top blunt tip end; and a second stage that includes the bottom tapered region that extends from the top blunt tip end to the bottom blunt tip end, wherein the first stage has a first effective index gradient that changes as a width of the top taper changes, and wherein the second stage has a second effective index gradient that changes as a width of the bottom taper changes. In some aspects, the first effective index gradient is different from the second effective index gradient. In some aspects, the top taper is over a portion of the bottom taper adjacent to the first end region, and another portion of the bottom taper adjacent to a bottom tip region is devoid of a top taper thereover.

In some embodiments, an optically coupled system can include: the adiabatic optical coupler of one of the embodiments; and an interposer optically coupled with the adiabatic optical coupler. In some aspects, an optical system can include; the optically coupled system of one of the embodiments; and a photonic integrated circuit (PIC) optically coupled to the adiabatic optical coupler.

In some embodiments, a method of manufacturing the adiabatic optic coupler can include: forming an optically transmissive body; shaping a portion of a top region of the optically transmissive body to form the top tapered region; and shaping a portion of a bottom region of the optically transmissive body to form the bottom tapered region.

In some embodiments, a method of propagating light through the adiabatic optical coupler to the interposer of the optically coupled system can include: introducing light into the first end region of the adiabatic optical coupler; propagating the light through the top tapered region and bottom tapered region; transitioning at least a portion of the light from the top tapered region to the bottom tapered region; propagating the light through the bottom tapered region; and transitioning the light from the bottom tapered region to the interposer.

In some embodiments, an adiabatic optical coupler can include: a tapered region that includes a taper having two tapered sides that taper from an end region to a tip region; and a sub-wavelength grating (SWG) optically coupled with the tip region. In some aspects, a gap is between a blunt tip end of the tip region and a first pillar of the SWG, and the SWG includes a pillar set that includes at least two spaced apart pillars with a gap between each pillar. In some aspects, the pillar set includes at least one rectangular pillar having a rectangular cross-sectional profile in a width, height and/or length planes. In some aspects, the pillar set includes at least one tapered pillar having a trapezoidal cross-sectional profile in the width and length plane. In some aspects, the at least one tapered pillar has a rectangular cross-sectional profile in the height and length plane and/or width and height plane.

In some embodiments, the adiabatic optical coupler includes: a first stage that includes the tapered region; and a second stage that includes the SWG, wherein the first stage has a first effective index gradient that changes as a width of the taper changes; and wherein the second stage has a second effective index gradient that changes as a width of the SWG changes. In some aspects, the first effective index gradient is different from the second effective index gradient.

In some embodiments, a method of manufacturing the adiabatic optic coupler can include: forming an optically transmissive body; shaping the optically transmissive body to form the tapered region; and shaping a portion of a tapered region of the optically transmissive body from the pillar set.

In some embodiments, a method of propagating light through the optically coupled system can include: introducing light into the end region of the adiabatic optical coupler; propagating the light through the tapered region; transitioning the light from the tapered region to the SWG; propagating the light through the SWG; and transitioning the light from the SWG to the interposer.

In some embodiments, an adiabatic optical coupler can include: a top tapered region that includes a top taper having two top tapered sides that taper from a first end region to a top tip region, the top taper having a first length; a bottom tapered region under the top tapered region, wherein the bottom tapered region includes a bottom taper having two bottom tapered sides that taper from the first end region to a bottom tip region, the bottom taper having a second length that is longer than the first length; and a sub-wavelength grating (SWG) optically coupled with the bottom tip region.

In some aspects, the SWG includes a pillar set, wherein the pillar set includes a plurality of spaced apart pillars with gaps between adjacent pillars.

In some embodiments, the adiabatic optical coupler includes: a first stage that includes the top tapered region and bottom tapered region that extends from the first end region to about the top blunt tip end; a second stage that includes the bottom tapered region that extends from the top blunt tip end to the bottom blunt tip end; and a third stage includes the SWG. In some aspects: the first stage has a first effective index gradient that changes as a width of the top taper changes; the second stage has a second effective index gradient that changes as a width of the bottom taper changes; and the third stage has a third effective index gradient that changes as a width of the pillar set changes. In some aspects, the top taper is over a portion of the bottom taper adjacent to the first end region, and another portion of the bottom taper adjacent to a bottom tip region is devoid of a top taper there over. In some aspects, a gap is between a bottom blunt tip end of the bottom tip region and a first pillar of the SWG. In some aspects, the pillar set includes at least one rectangular pillar having a rectangular cross-sectional profile in a width, height and/or length planes. In some aspects, the pillar set includes at least one tapered pillar having a trapezoidal cross-sectional profile in the width and length plane, wherein the at least one tapered pillar has a rectangular cross-sectional profile in the height and length plane and/or width and height plane. In some aspects, each gap is air, an optically transmissive material, includes SiN, or includes silicon dioxide. In some aspects, each pillar of the pillar set has a smaller width than a preceding pillar from the bottom blunt tip end to an opposite pillar.

In some embodiments, a method of manufacturing the adiabatic optic coupler can include: forming an optically transmissive body; shaping a portion of a top region of the optically transmissive body to form the shape of the top tapered region and to form the shape of the bottom tapered region; and shaping a portion of the bottom tapered region of the optically transmissive body to form the SWG.

In some embodiments, a method of propagating light through an optically coupled system can include: introducing light into the end region of the adiabatic optical coupler; propagating the light through the top tapered region and bottom tapered region; transitioning at least a portion of the light from the top tapered region to the bottom tapered region; propagating the light through the bottom tapered region; transitioning the light from the bottom tapered region to the SWG; propagating the light through the SWG; and transitioning the light from the SWG to the interposer. In some aspects, the method can include: transitioning the light from the top tapered region to the bottom tapered region when an effective index of refraction of the top tapered region matches an index of refraction of the bottom tapered region; and transitioning the light from the SWG to the interposer when the effective index of refraction of the SWG matches an index of refraction of the interposer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIGS. 3A-3B include different views that show the adiabatic optical coupler.

Figure 1:
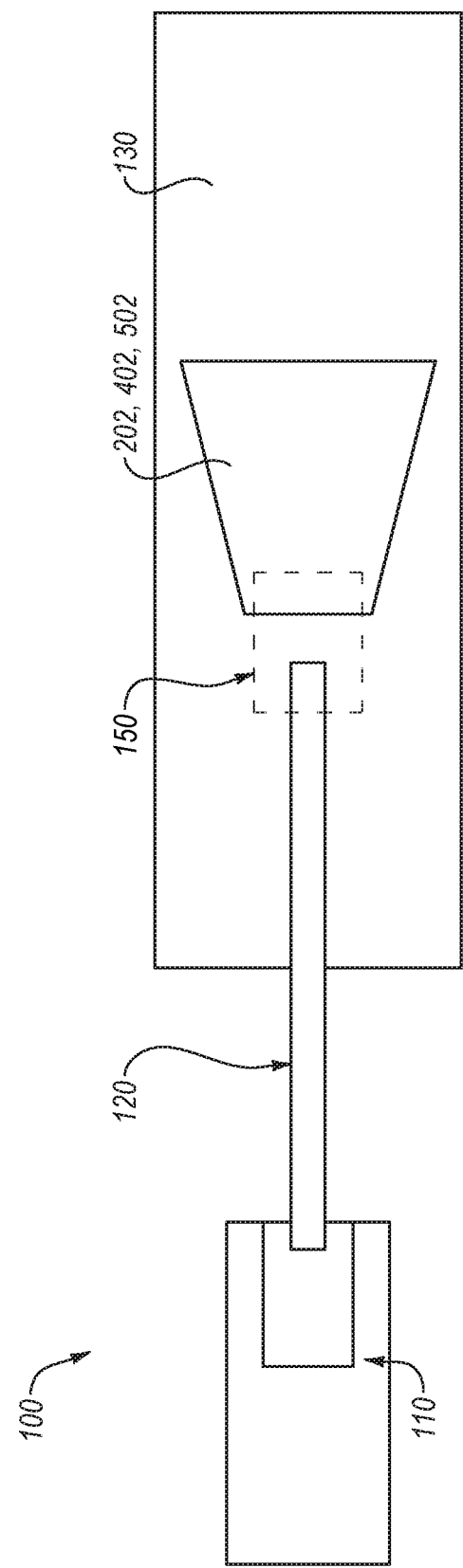
FIG. 1 shows an embodiment of an optical system.

The elements and components in the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology relates to an adiabatic optical coupler that can couple light directly to an interposer. The adiabatic optical coupler can be used with silicon photonics. Some examples of systems where the adiabatic coupler can be used include CWDM4, CWDM2, PSM4, LR4, LR8, or others. The adiabatic optical coupler can include a Si waveguide that can be coupled directly to an interposer. As such, a silicon nitride layer can be omitted between the waveguide and the interposer (e.g., interposer waveguide). Now, an adiabatic optical coupler can be located between a waveguide (or be part of a waveguide) and the interposer, such that the optical signal passes through the adiabatic optical coupler directly into the interposer without passing through a silicon nitride layer. The embodiments of the adiabatic optical coupler can include tapered features and/or grating pillars to promote the optical signal to pass directly from the adiabatic optical coupler into the interposer.

The present adiabatic optical coupler can be tapered, but can omit a sharp taper and sharp tip, which can be challenging to fabricate. As such, the adiabatic optical coupler can include a blunt end that can have an end region directly coupled with the interposer, such as by being in contact therewith or via an optically transmissive adhesive. In some aspects, the interposer can be directly coupled (directly in contact) with a top surface of the adiabatic optical coupler.

The adiabatic optical coupler can be used for low loss and broadband optical input/output (IO) for silicon photonic chips. Due to the large refractive index difference, a sharp taper tip on a Si waveguide can be used to directly couple light from the Si waveguide to the interposer waveguide, however, the shape of the adiabatic optical coupler described herein can include a blunt end that can be coupled to the interposer. The blunt end or a top region near the blunt end can be in contact with the interposer. In an example, the adiabatic optical coupler can have a taper with a top surface that can be coupled with the interposer. Now, the adiabatic optical coupler described herein can be used to directly couple light from the Si waveguide to the interposer by reducing the effective index of the Si waveguide to a threshold where the light preferentially moves into the interposer. The adiabatic optical coupler allows for adiabatic coupling directly to the interposer without a silicon nitride (SiN) layer. Thus, the omission of the SiN layer can be advantageous for manufacturing purposes. Also, the blunt tip allows for improved manufacturing and results in low loss of light.

The adiabatic optical coupler solves the problem of the index of refraction of silicon (~3.5) being much higher than the index of refraction of an interposer waveguide core, which is glass (e.g., 1.48-1.52), polymer (e.g., refractive index of 1.3-1.7), or thin SiN (e.g., refractive index about 1.9) depending on the interposer design. In one example, the refractive index of the interposer can range from 1.3 to 1.9 depending on the material. Thus, the adiabatic optical coupler can result in an effective index of refraction in the range of 1.3 to 1.9 in order to match the interposer.

Figure 6:
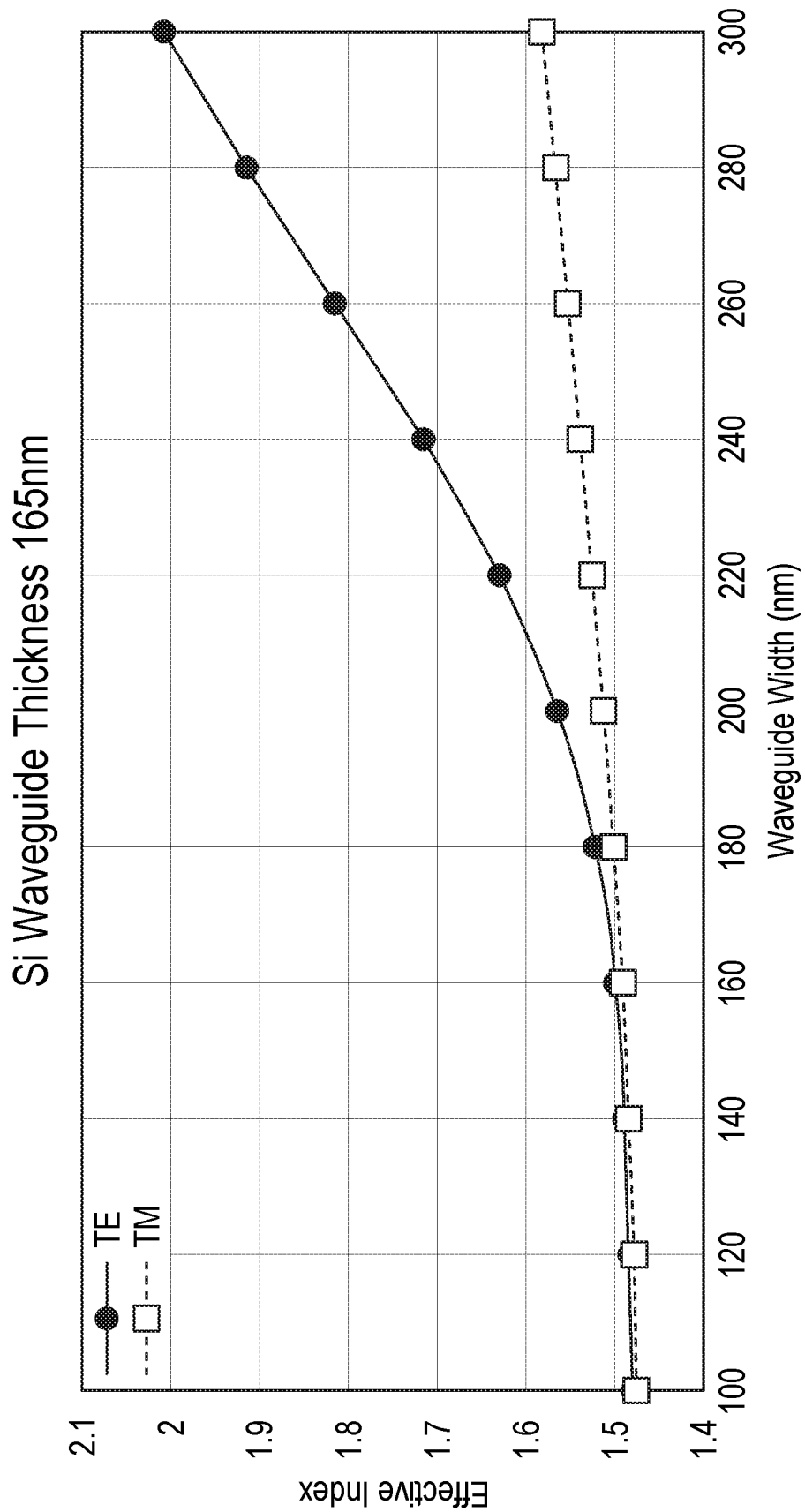
FIG. 6 includes a graph of data that shows the taper of the embodiment in FIG. 2A can reduce the effective index of refraction until it matches the next stage or the interposer.

The adiabatic optical coupler can include a tapered shape that can effectively squeeze the optical mode out to the cladding and thereby reduce the mode index to match an interpose waveguide mode. The tapered shape can reduce an effective index of refraction as the taper decreases in cross-sectional dimension (e.g., width and height plane tapers) until it is within a certain threshold of the index of refraction of the interposer, and when within the certain threshold of the index of refraction of the interposer the light transfers from the adiabatic optical coupler to the interposer. While the taper can go to a sharp tip, it may be better at least in manufacturing terms for the tip of the taper to be a blunt end with cross-sectional width and height. In an example, with a thick Si material (e.g., 300 nm height or thickness) a blunt tip with a width of less than or about 50 nm can be used to reduce the TM mode index below 1.5. However, such a tip less than or about 50 nm may be difficult to manufacture within a required parameter. As such, the adiabatic coupler described herein with a first stage taper having a first stage index of refraction gradient and a second stage index of refraction gradient can allow for the tapered tips to have widths at least about 50 nm, or at least about 60 nm, or at least about 75 nm, or at least about 90 nm, or at least about 100 nm, or at least about 120 nm, or at least about 140 nm, or at least about 150 nm, or at least about 160 nm, and possibly up to 180 nm, as shown in FIG. 6. This can be for a 165 nm height Si adiabatic coupler (e.g., height of bottom portion or region) with an index of refraction less than 1.5 and having a taper tip with a width of less than or about 150 nm. Such a tip width can be used for a first stage taper and/or a second stage taper. However, it should be recognized that the dimensions may vary for different heights.

FIG. 1 shows an embodiment of an optical system 100. The optical system 100 can include a photonic integrated circuit (PIC) 130. The optical system 100 can include an adiabatic optical coupler 202, 402, 502 of one of the embodiments described herein optically coupled with the PIC 130. The optical system 100 can include an interposer 150 optically coupled with the adiabatic optical coupler 202, 402, 502. The optical system 100 can include at least one optical fiber 120 optically coupled to the interposer 150. In some aspects, the at least one optical fiber 120 is optically coupled to an opto-electronic device 110. In some aspects, the PIC 130 is coupled to a waveguide (not shown) that is coupled to the adiabatic coupler 202, 402, 502. In some aspects, the at least one optical fiber 120 comprises a single mode fiber. In some aspects, the at least one optical fiber 120 comprises a multi-mode fiber. In some aspects, the at least one optical fiber 120 comprises an optical fiber ribbon.

Figure 2A:
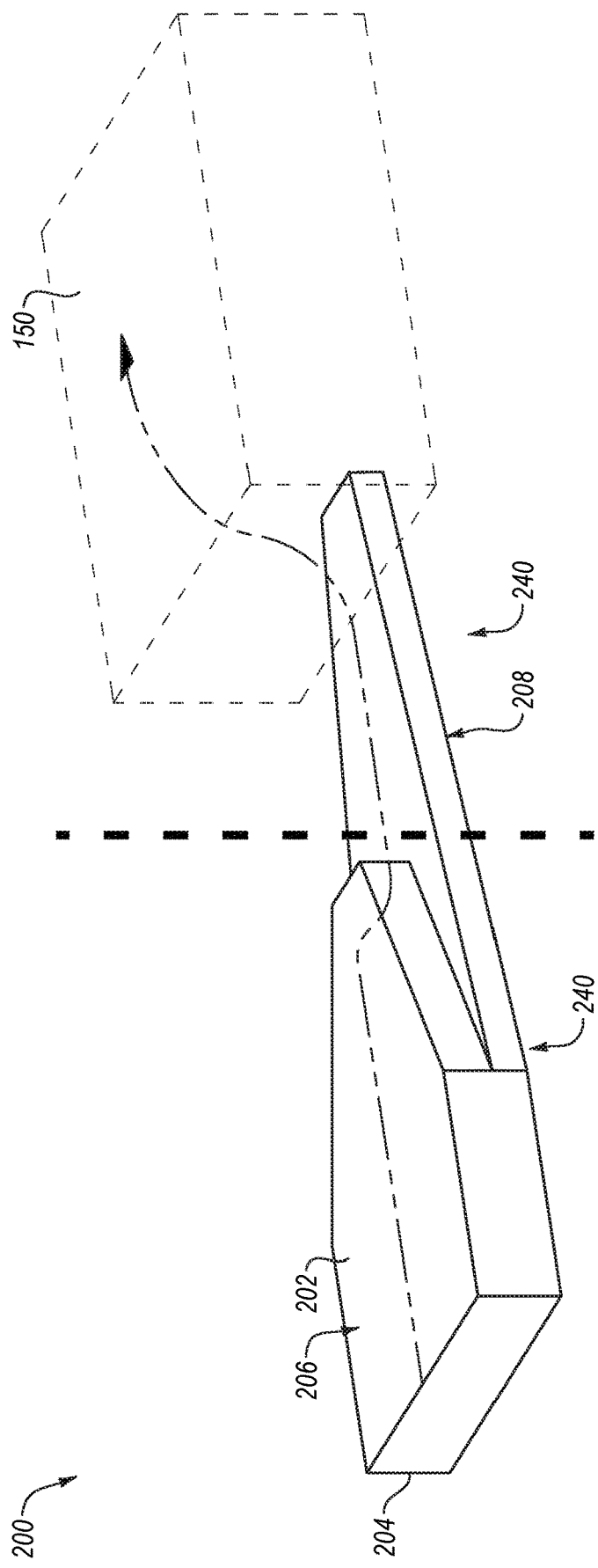
FIGS. 2A-2C include different views that illustrate an embodiment of an adiabatic optical coupler that is optically coupled to an interposer to form an optically coupled system.
Figure 2B:
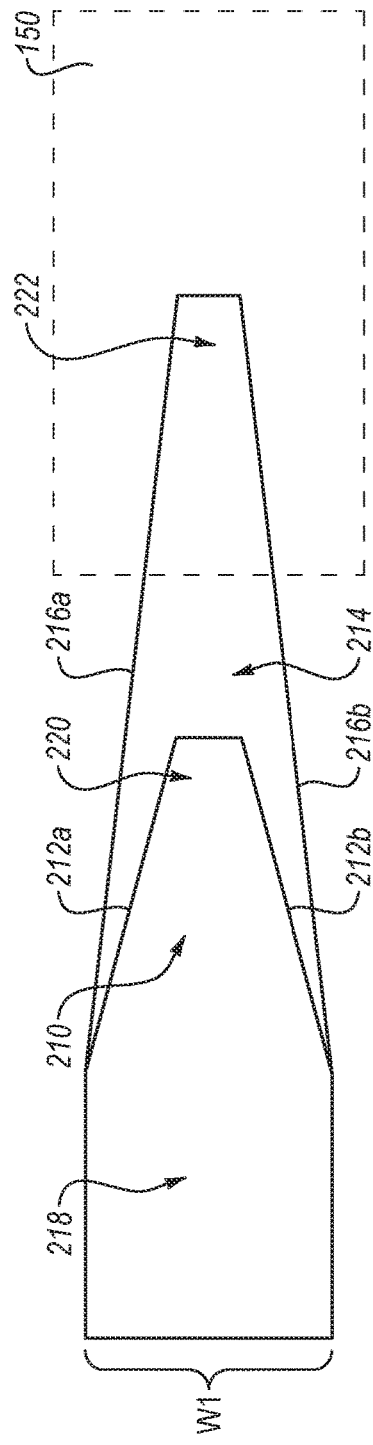
Figure 2C:
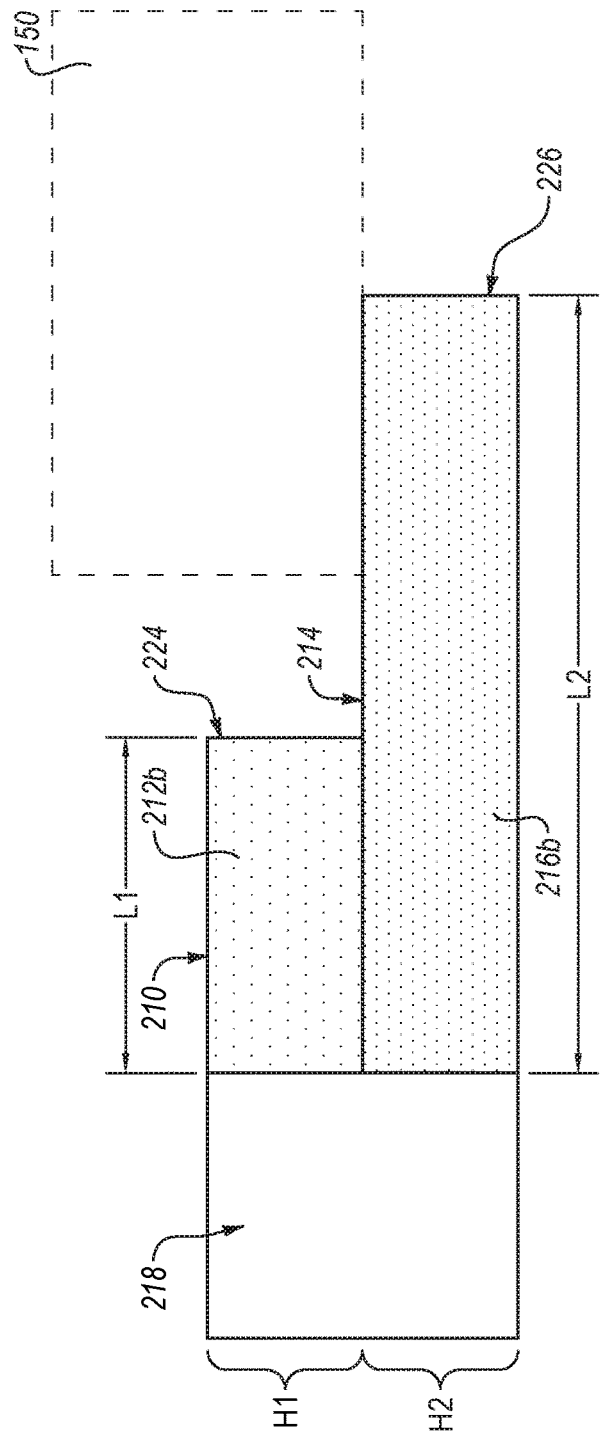

As shown in FIG. 1, an optical system can include the optically coupled system 200 of FIGS. 2A-2C, and a photonic integrated circuit (PIC) 130 optically coupled to the adiabatic optical coupler 202.

FIGS. 2A-2C illustrate an embodiment of an adiabatic optical coupler 202 that is optically coupled to an interposer 150 to form an optically coupled system 200. FIGS. 3A and 3B show the adiabatic optical coupler 202 and certain features thereof. The adiabatic optical coupler 202 can include a top tapered region 206 that includes a top taper 210 having two top tapered sides 212a, 212b that taper from a first end region 218 to a top tip region 220. The top taper 210 can have a first length L1. The adiabatic optical coupler 202 can also include a bottom tapered region 208 under the top tapered region 206. The bottom tapered region 208 can include a bottom taper 214 having two bottom tapered sides 216a, 216b that taper from the first end region 218 to a bottom tip region 222. The bottom taper 214 can have a second length L2 that is longer than the first length L1. The adiabatic optical coupler 202 can be configured with certain defined dimensions, such as: the first end region 218 having a first width W1; the top tapered region having a first height H1; and the bottom tapered region having a second height H2, wherein the first height H1 is larger, the same as, or smaller than the second height H2.

Also, the adiabatic optical coupler 202 when silicon can include the following dimensions: the first width W1 being 200 nm to about 1000 nm; the first height H1 being 50 nm to about 200 nm; and the second height H2 being 50 nm to about 200 nm.

Additionally, the top tip region 220 can be configured with certain defined dimensions and includes a top blunt tip end 224 having a second width W2, and the bottom tip region 222 includes a bottom blunt tip end 226 having a third width W3, wherein the second width W2 is the same as, larger than, or smaller than the third width W3 (FIG. 3A). When the adiabatic optical coupler 202 is silicon, the following dimensions can be used: the second width W2 being 50 nm to about 180 nm; and the third width W3 being 50 nm to about 180 nm.

As shown, the adiabatic optical coupler 202 can include the top tapered region 206 having a top surface 228. Also, the bottom tapered region 208 can have a top surface 230 and opposite bottom surface 232. The first end region 218 can have an end surface 234. In some aspects, the top tapered region 206 is integrated with the bottom tapered region 208 as a unitary optically transmissive body 204. For example, a uniform singular body can be fabricated, such as by layered deposition, and then etched to form the defined shape. In some aspects, the top tapered region 206 is coupled with the bottom tapered region 208 as a combined optically transmissive body 204. For example, two different bodies can be fabricated and then coupled together to form the adiabatic optical coupler.

Referring specifically to FIG. 2A, the adiabatic optical coupler 202 can include: a first stage 240 that includes the top tapered region 206 and bottom tapered region 208 and it extends from the first end region 218 to about the top blunt tip end 224. Sequentially adjacent to the first stage 240 is a second stage 242 that includes the bottom tapered region 208 and it extends from the top blunt tip end 224 to the bottom blunt tip end 226. The first stage 240 has a first effective index gradient that changes as a width of the top taper 210 changes. The second stage 260 has a second effective index gradient that changes as a width of the bottom taper 212 changes.

Generally, the material of the adiabatic optical coupler has an index of refraction of 3.0 to about 3.9, or about 3.5. In some embodiments, the adiabatic optical coupler is silicon.

As shown, the top taper 210 is over a portion of the bottom taper 214. This results in the double taper shape as shown in FIGS. 2A-2B and 3A. The top taper 210 can form the first stage 240, and the bottom taper 214 can form the second stage 242. The width of the taper of the first stage 240 can be reduced until it has an effective index of refraction at a narrowed region that is within a threshold of the index of refraction of the bottom taper 214 at some location. The effective index of refraction of the top taper 210 at some point matches the index of refraction of the bottom taper 214 at a defined position, and within a given threshold around this position, the light that is in the top taper 210 transfers into the bottom taper 214. The top taper 210 can be over a portion of the bottom taper 214 adjacent to the first end region 218 and another portion of the bottom taper 214 that is adjacent to a bottom tip region 222 is devoid of a top taper 210 there over, which is at least part of the second stage 242.

As designed, the bottom taper 214 includes wings 236 laterally from the two top tapered sides 212a, 212b to the two bottom tapered sides 216a, 216b. These are formed by the selective shaping of the shorter top taper 210. The top tip region 220 includes a top blunt tip end 224 having a second width W2, and the bottom tip region 222 includes a bottom blunt tip end 226 having a third width W3, wherein the second width W2 is the same as, or smaller than the third width W3. The tip widths can be as described herein, such as larger than 50 nm.

FIGS. 2A-2C show different views of an optically coupled system 200 that includes the adiabatic optical coupler 202, and an interposer 150 optically coupled with the adiabatic optical coupler 202. FIGS. 3A-3B show the adiabatic optical coupler without an interposer. The interposer 150 can be a waveguide formed from a material selected from the group consisting of glass, polymer, and SiN, where glass and polymer can be preferred. The adiabatic optical coupler 202 can be in direct contact with the interposer 150 so that the materials thereof are touching. Also, the adiabatic optical coupler 202 can be adhered with the interposer 150 by an adhesive layer.

In some embodiments, an adiabatic optical coupler 202 can include: a top tapered region 206 that includes a top taper 210 having two top tapered sides 212a, 212b that taper from a first end region 218 to a top tip region 220, the top taper 210 having a first length L1; and a bottom tapered region 208 under the top tapered region 206, wherein the bottom tapered region 208 includes a bottom taper 214 having two bottom tapered sides 216a, 216b that taper from the first end region 218 to a bottom tip region 222, the bottom taper 214 having a second length L2 that is longer than the first length L1. In some aspects: the top tapered region has a first height H1; and the bottom tapered region has a second height H2, wherein the first height H1 is larger, the same as, or smaller than the second height H2. In some aspects, the top tip region 220 includes a top blunt tip end 224 having a second width W2, and the bottom tip region 222 includes a bottom blunt tip end 226 having a third width W3, wherein the second width W2 is the same as, larger than, or smaller than the third width W3. In some aspects: the top tapered region 206 has a top surface 228; the bottom tapered region 208 has a top surface 230 and opposite bottom surface 232; and the first end region 218 has an end surface 234. In some aspects, the top tapered region 206 is integrated with the bottom tapered region 208 as a unitary optically transmissive body 204. In some aspects, the top tapered region 206 is coupled with the bottom tapered region 208 as a combined optically transmissive body 204, such as when the adiabatic optical coupler is silicon or glass.

In some embodiments, the adiabatic optical coupler 202 includes: a first stage 240 that includes the top tapered region 206 and bottom tapered region 208 that extends from the first end region 218 to about the top blunt tip end 224; and a second stage 242 that includes the bottom tapered region 208 that extends from the top blunt tip end 224 to the bottom blunt tip end 226. In some aspects, the first stage 240 has a first effective index gradient that changes as a width of the top taper 210 changes. In some aspects, the second stage 242 has a second effective index gradient that changes a width of the bottom taper 214 changes.

In some embodiments, the top taper 210 is over a portion of the bottom taper 214. the top taper 210 is over a portion of the bottom taper 214 adjacent to the first end region 218 and another portion of the bottom taper 214 adjacent to a bottom tip region 222 is devoid of a top taper 210 there over. In some aspects, the bottom taper 214 includes wings 236 laterally from the two top tapered sides 212a, 212b to the two bottom tapered sides 216a, 216b.

In some embodiments, the interposer 150 is a waveguide formed from a material selected from the group consisting of glass, polymer, and SiN. In some aspects, the adiabatic optical coupler 202 is in contact with the interposer 150. In some aspects, the adiabatic optical coupler 202 is adhered with the interposer 150 by an adhesive layer.

A method of manufacturing the adiabatic optic coupler 202 can be provided. The method includes forming an optically transmissive body 204 having a shape of the bottom tapered region 208. Such forming can be by any method of forming a silicon body. The method can also include shaping a portion of a top region of the optically transmissive body 204 to form the shape of the top tapered region 206 over the bottom tapered region 208. The shaping can be by etching or other selective removal of material to form the illustrated shape of the adiabatic optical coupler 202.

In some embodiments, a method of manufacturing the adiabatic optic coupler 202 can include: forming an optically transmissive body 204; shaping a portion of a top region of the optically transmissive body 204 to form the top tapered region 206; and shaping a portion of a bottom region of the optically transmissive body 204 to form the bottom tapered region 208.

In some embodiments, a method of manufacturing the adiabatic optic coupler 202 can include forming an optically transmissive body 204 having a shape of the top tapered region 206 over a shape of the bottom tapered region 208.

In some embodiments, a method of propagating light through the adiabatic optical coupler 202 to the interposer 150 of the optically coupled system 200 can be provided. Such a method can include: introducing light into the first end region 218; propagating the light through the top tapered region 206 and bottom tapered region 208; transitioning at least a portion of the light from the top tapered region 206 to the bottom tapered region 208; propagating the light through the bottom tapered region 208; and transitioning the light from the bottom tapered region 208 to the interposer 150.

In some embodiments, the light propagating method can include: propagating the light through the top tapered region 206 and bottom tapered region 208 until an effective index of refraction of the top tapered region 206 matches an index of refraction of the bottom tapered region 208; transitioning the at least a portion of the light from the top tapered region 206 to the bottom tapered region 208; propagating the light through the bottom tapered region 208 until an effective index of refraction of the bottom tapered region 208 matches an index of refraction of the interposer 150; and transitioning the light from the bottom tapered region 208 to the interposer 150.

In some embodiments, the light propagating method can include: transitioning the light from the top tapered region 206 to the bottom tapered region 208 when the effective index of refraction of the top tapered region 206 matches an index of refraction of the bottom tapered region 208; and transitioning the light from the bottom tapered region 208 to the interposer 150 when the effective index of refraction of the bottom tapered region 208 matches an index of refraction of the interposer 150. In some aspects, the light propagating method can include propagating the light through the top tapered region 206 and the bottom tapered region 208 and occurs when the effective index of refraction is below a certain threshold. In some aspects, the light propagating method can include propagating the at least a portion of the light from the top tapered region 206 into the bottom tapered region 208 and occurs when the effective index of refraction of the top tapered region 206 reaches a certain threshold.

In some embodiments, the light propagating method can include: passing the light traveling through a first stage 240 of the top tapered region 206 and bottom tapered region 208 that extends from the first end region 218 to about the top blunt tip end 224; and transitioning the light traveling from the first stage 240 to a second stage 242 that includes the bottom tapered region 208 that extends from the top blunt tip end 224 to the bottom blunt tip end 226. In some aspects, the first stage has a first effective index gradient that changes as a width of the top taper 210 changes. In some aspects, the second stage has a second effective index gradient that changes as a width of the bottom taper 212 changes. In some aspects, the method includes transitioning the light from the second stage 242 to the interposer 150.

Figure 4A:
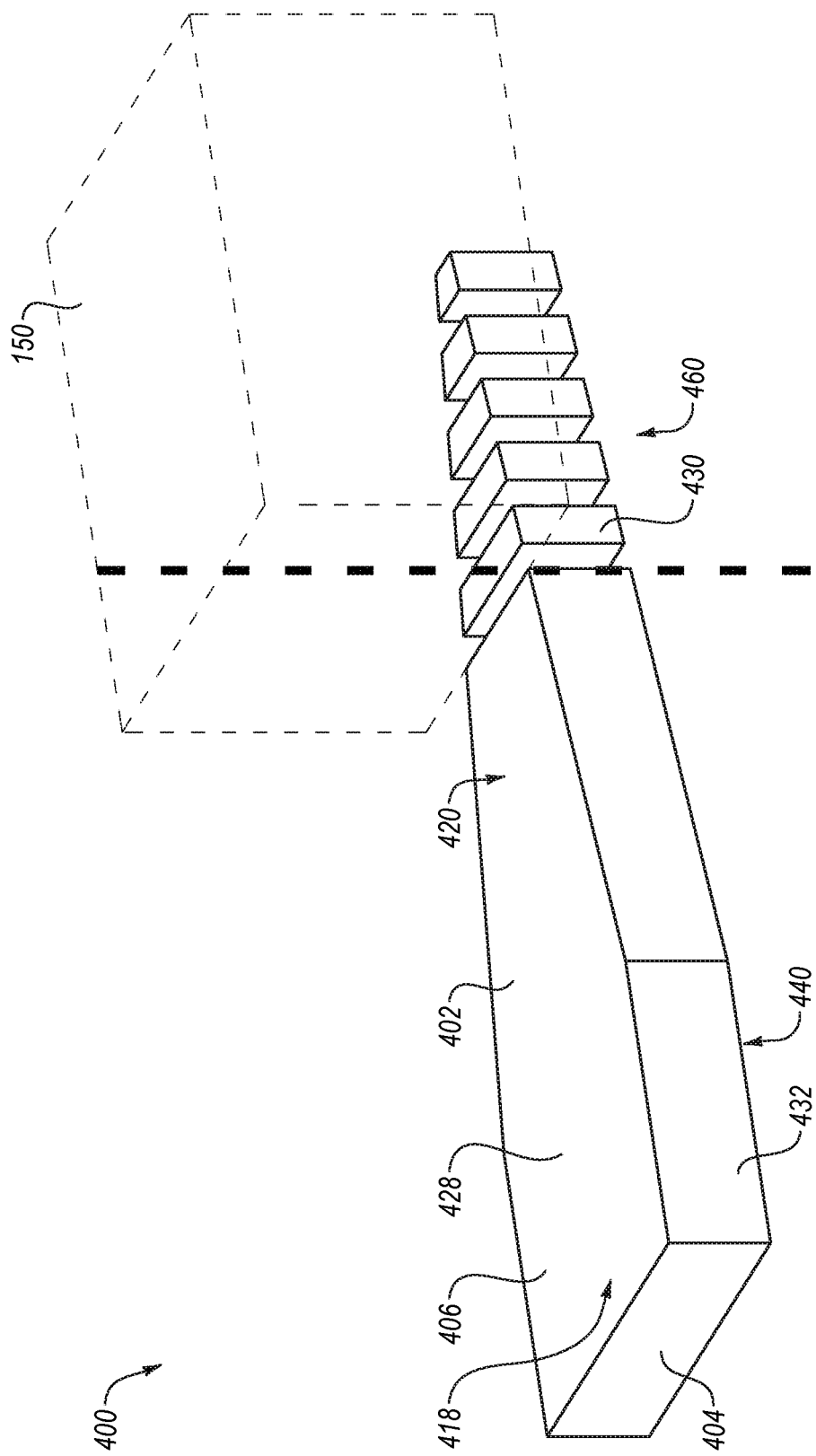
FIGS. 4A-4C include different views that show an embodiment of an adiabatic optical coupler.
Figure 4B:
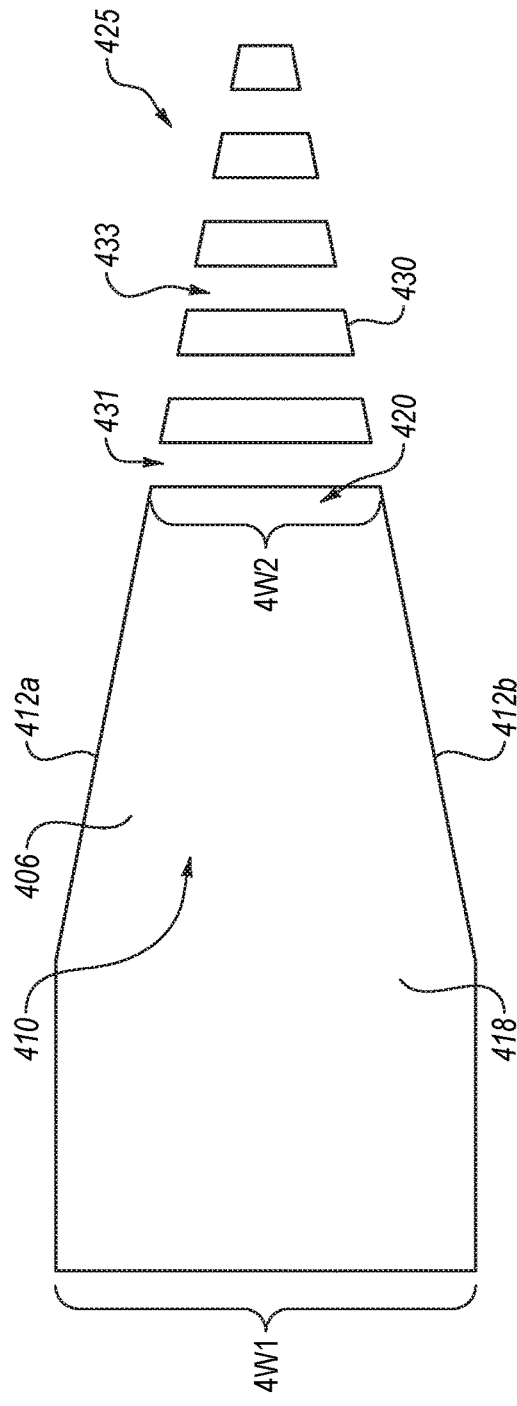
Figure 4C:
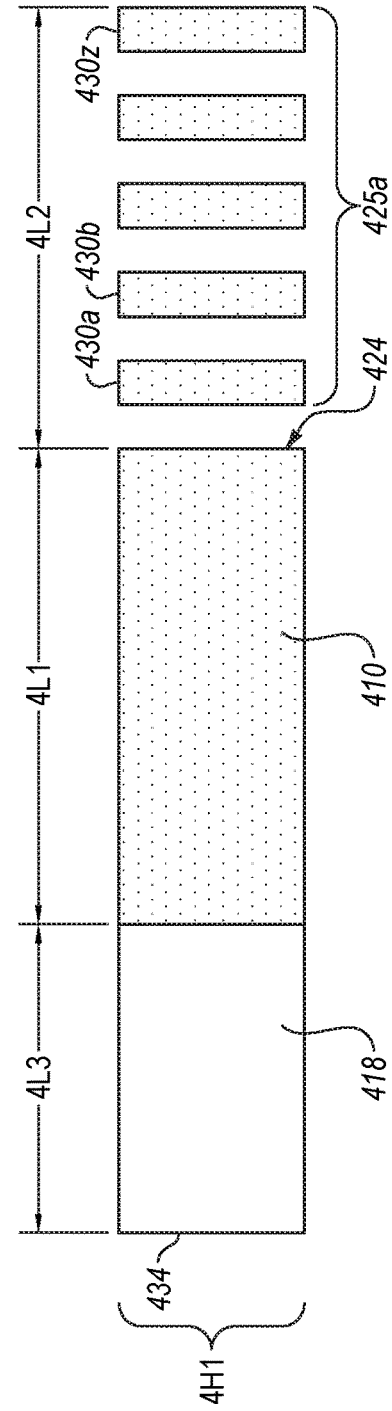

FIGS. 4A-4C show an embodiment of an adiabatic optical coupler 402. The adiabatic optical coupler 402 can have a tapered region 406 that includes a taper 410 having two tapered sides 412a, 412b that taper from an end region 418 to a tip region 420. The taper 410 can have a length 4L1. The adiabatic optical coupler 402 can also include a sub-wavelength grating (SWG) 425 optically coupled with the tip region 420. The SWG can have a length 4L2. As shown, the SWG 425 extends from the tip region 420. The adiabatic optical coupler 402 can include a gap 431 between a blunt tip end 424 of the tip region 420 and the SWG 425. In another aspect, the SWG 425 further comprises a gap 431 between a blunt tip end 424 of the tip region 420 and a first pillar 430 of the SWG 425. That is the gap 431 is either between the blunt tip end 424 and SWG 425, or the gap 431 is considered to be part of the SWG 425.

As shown, the SWG 425 includes a pillar set 425a that include at least two spaced apart pillars 430. In some embodiments of the adiabatic optical coupler 402, the pillar set 425a can include n pillars 430, wherein n is an integer. For example, n is 1, 2, 3, 4, 5, 6, 7, 8, 9, 10, 11, 12, 13, 14, 15, 16, 17, 18, 19, or 20. In another example, n is an integer being or between any of the following integers 10, 20, 30, 40, 50, 60, 70, 80, 90, 100, 110, 120, 130, 140, 150, 160, 170, 180, 190, or 200. The SWG 425 can include a gap 431 between the blunt tip end 424 and a first pillar 430a of the pillar set 425a. In some aspects, the gap 431 includes a length dimension of about 50 nm to about 300 nm in a longitudinal direction.

In some embodiments, the pillar set 425a includes at least one rectangular pillar 430 having a rectangular cross-sectional profile (FIG. 4A) in a width, height and/or length planes. In some embodiments, the pillar set 425a includes at least one tapered pillar 430 having a trapezoidal cross-sectional profile (FIG. 4B) in the width and length plane. Such a pillar 430 having a trapezoidal cross-sectional profile may have a rectangular cross sectional profile in the height and length plane and in the height and width plane. Accordingly, any pillar such as a rectangular pillar 430 or tapered pillar 430 can have a rectangular cross-sectional profile in the height and length plane and/or width and height plane. As shown in FIG. 4A, the SWG 425 is optically coupled to an interposer 150.

The SWG 425 can include a gap 433 between each pillar 430. The gap 433 between each pillar includes a length dimension of about 50 nm to about 300 nm in a longitudinal direction. In some aspects, the gap 433 between each pillar includes a length dimension that is equal to, less than, or greater than a length dimension of the gap 431 between the blunt tip end 424 and the first pillar 430a of the pillar set 425a. In some aspects, the gap 431 or gap 433 is air. In some aspects, the gap 431 or gap 433 is an optically transmissive material. In some aspects, the gap 431 or gap 433 includes SiN. In some aspects, the gap 431 or gap 433 includes silicon dioxide.

As shown, the tapered region 406 can include various defined dimensions, such as: a blunt tip end 424 having a height 4H1 and a width 4W2; and the end region 418 having a width 4W1 and a length 4L3 and the height 4H1. For example, the adiabatic optical coupler 402 can include one or more of the following dimensions: the length 4L1 is about 0.1 mm to about 1.0 mm; the length 4L2 is about 50 μm to about 1.0 mm; the length 4L3 is about 1 μm to about 0.1 mm; the height 4H1 is about 200 nm to about 400 nm; the width 4W1 being 150 nm to about 1000 nm; and the width 4w2 being 100 nm to about 500 nm.

The pillar set 425a can be tapered from a first pillar to a last pillar. Each pillar 430 of the pillar set 425a can have a smaller width than a preceding pillar 430 from the blunt tip end 424 to an opposite pillar 430. In some aspects, the pillar set 425a includes a first pillar 430a adjacent to the blunt tip end 424 that is larger than a second pillar 430b, the first pillar 430a being between the blunt tip end 424 and the second pillar 430b. In some aspects, the pillar set 425a includes a tapered width profile having sequentially smaller widths from the blunt tip end 424 to the last pillar. In some aspects, a first pillar 430a of the n number of pillars 430 has a greater width than a second pillar 430b of the n number of pillars 430. In some aspects, a width of the pillars 430 becomes smaller moving farther away from the blunt tip end 424. In some aspects, a first pillar 430a is wider than a last pillar 430z.

As shown, the tip region 420 includes a blunt tip end 424 having a width 4W2. The second width 4W2 can be smaller than a width 4W1 of the end region 418. The n number of tapered pillars 430 in the pillar set 425a can include a pillar width that is the same as, or smaller than the width 4W2 of the blunt tip end 424. In some aspects, a first pillar of the n number of tapered pillars has a greater width than a second pillar, which has a greater width than a third pillar, which has a greater width than a fourth pillar, which has a greater width than a fifth pillar. In some aspects, the n number of tapered pillars include a decreasing width as the pillar set 425 moves from the blunt tip end 424 and toward the interposer 150.

The adiabatic optical coupler 402 can include the tapered region 406 having a top surface 428 and a bottom surface 432. In some aspects, the first end region 418 has an end surface 434, which may receive the input light.

In some embodiments, the tapered region 406 is integrated with the SWG 425 as a unitary optically transmissive body 404. In some other embodiments, wherein the tapered region 406 is coupled with the subwavelength grating 425 as a combined optically transmissive body 404.

The adiabatic optical coupler 402 can include a first stage 440 that includes the tapered region 406 and a second stage 460 that includes the SWG 425. In some aspects, the first stage 440 has a first effective index gradient that changes as a width of the taper 410 changes. In some aspects, the second stage 460 has a second effective index gradient that changes as a width of the SWG 425 changes. In some aspects, the adiabatic optical coupler is silicon.

An optically coupled system 400 can include the adiabatic optical coupler 402 and an interposer 150 optically coupled with the adiabatic optical coupler 402 as shown in FIG. 4A. The interposer 150 is a waveguide formed from a member selected from the group consisting of glass, polymer, and SiN. In some aspects, the adiabatic optical coupler 402 is in contact with the interposer 150. In some aspects, the adiabatic optical coupler 402 is adhered with the interposer 150 by an adhesive layer.

A method of manufacturing the adiabatic optic coupler 402 is provided. Such a method can include: forming an optically transmissive body 404 having a shape of a tapered region 406; and shaping a portion of a tapered region 406 of the optically transmissive body 404 to form the SWG 425.

In one embodiment, a method of manufacturing the adiabatic optic coupler 402 can include: forming an optically transmissive body 404; shaping the optically transmissive body 404 to form the tapered region 406; and shaping a portion of a tapered region 406 of the optically transmissive body 404 to form the pillar set 425a.

In one embodiment, a method of manufacturing the adiabatic optic coupler 402 can include forming at least one optically transmissive body 404 to have the shape of the tapered region and the pillar set 425a of the SWG 425.

A method of propagating light through the optically coupled system 400 is provided. Such a method can include: introducing light into the end region 418; propagating the light through the tapered region 406; transitioning the light from the tapered region 406 to the SWG 425; propagating the light through the SWG 425; and transitioning the light from the SWG 425 to the interposer 150.

In one embodiment, a method of propagating light through the optically coupled system 400 can include: introducing light into the end region 418; propagating the light through the tapered region 406 until an effective index of refraction of the tapered region 406 results in the light passing into the SWG 425; transitioning the light from the tapered region 406 to the SWG 425 when the effective index of refraction of the tapered region 406 results in the light passing into the SWG 425; propagating the light through the SWG 425 until an effective index of refraction of the SWG 425 matches an index of refraction of the interposer 150; and transitioning the light from the SWG 425 to the interposer 150 when the effective index of refraction of the SWG 425 matches an index of refraction of the interposer 150.

In one embodiment, a method of propagating light through the optically coupled system 400 can include: introducing light into the end region 418; propagating the light through the tapered region 406 until an effective index of refraction of the tapered region 406 results in the light passing into the SWG 425; transitioning the light from the tapered region 406 to the SWG 425; propagating the light through the SWG 425 until an effective index of refraction of the SWG 425 matches an index of refraction of the interposer 150; and transitioning the light from the SWG 425 to the interposer 150.

In the method, a first stage 440 of the tapered region 406 has a first effective index gradient that changes as a width of the taper 410 changes. In some aspects, a second stage 460 of the SWG 425 has a second effective index gradient that changes as a width of the SWG 425 changes. In some aspects, the methods can include: passing the light traveling through the first stage 440 to about the blunt tip end 424; and transitioning the light traveling from the first stage 440 to the second stage 460. In some aspects, the method can include transitioning the light from the second stage 460 to the interposer 150.

FIGS. 5A-5D illustrate an embodiment of an adiabatic optical coupler 502. The adiabatic optical coupler can include a top tapered region 506 that includes a top taper 510 having two top tapered sides 512a, 512b that taper from a first end region 518 to a top tip region 520. The top taper 510 can have a first length 5L1. The adiabatic optical coupler can include a bottom tapered region 508 under the top tapered region 506. The bottom tapered region 508 includes a bottom taper 514 having two bottom tapered sides 516a, 516b that taper from the first end region 518 to a bottom tip region 522. The bottom taper 514 can have a second length 5L2 that is longer than the first length 5L1. The adiabatic optical coupler can include a sub-wavelength grating (SWG) 525 optically coupled with the bottom tip region 522, the SWG having a length 5L3. As shown, the SWG 525 includes a pillar set 525a, wherein the pillar set 525a includes a plurality of spaced apart pillars 530. The pillar set 525a includes n pillars, wherein n is 1, 2, 3, 4, 5, 6, 7, 8, 9, 10, 11, 12, 13, 14, 15, 16, 17, 18, 19, or 20, or n is an integer being or between any of the following integers 10, 20, 30, 40, 50, 60, 70, 80, 90, 100, 110, 120, 130, 140, 150, 160, 170, 180, 190, or 200.

In some embodiments, the adiabatic optical coupler 502 can have various defined dimensions, such as: the first end region 518 having a first width 5W1; the top tapered region 506 having a first height 5H1; and the bottom tapered region having a second height 5H2. In some aspects, the first height 5H1 is larger, the same as, or smaller than the second height 5H2. In some aspects, the adiabatic optical coupler 502 can include the following dimensions: the first width 5W1 being 200 nm to about 1000 nm; the first height 5H1 being 50 nm to about 300 nm; and the second height 5H2 being 50 nm to about 300 nm.

In some embodiments of the adiabatic optical coupler 502, the top tip region 520 includes a top blunt tip end 524 having a second width 5W2, and the bottom tip region 522 includes a bottom blunt tip end 526 having a third width 5W3, wherein the second width 5W2 is the same as, larger than, or smaller than the third width 5W3, wherein: the second width 5W2 being 50 nm to about 300 nm; and the third width 5W3 being 50 nm to about 300 nm.

The adiabatic optical coupler 502 has various features, such as the top tapered region 506 with a top surface 528. The bottom tapered region 508 can have a top surface 529 and opposite bottom surface 532. The first end region 518 has an end surface 534. In some aspects, the top tapered region 506 is integrated with the bottom tapered region 508 as a unitary optically transmissive body 504. In some aspects, the top tapered region 506 is integrated with the bottom tapered region 508 and optionally with the SWG 525 as a unitary optically transmissive body 504. In some aspects, the top tapered region 506 is a body that is coupled with a different body of the bottom tapered region 508 as a combined optically transmissive body 504.

In some aspects, the adiabatic optical coupler 502 includes: a first stage 540 that includes the top tapered region 506 and bottom tapered region 508 that extends from the first end region 518 to about the top blunt tip end 524; a second stage 560 that includes the bottom tapered region 508 that extends from the top blunt tip end 524 to the bottom blunt tip end 526; and a third stage 570 includes the SWG 525. In some aspects, the first stage 540 has a first effective index gradient that changes as a width of the top taper 510 changes. In some aspects, the second stage 560 has a second effective index gradient that changes as a width of the bottom taper 514 changes. In some aspects, the third stage 570 has a third effective index gradient that changes as a width of the SWG 525 changes.

In the adiabatic optical coupler 502, the top taper 510 is over a portion of the bottom taper 514. Also, the top taper 510 is over a portion of the bottom taper 514 adjacent to the first end region 518 and another portion of the bottom taper 514 adjacent to a bottom tip region 522 is devoid of a top taper 510 there over. The bottom taper 514 includes wings 536 laterally from the two top tapered sides 512a, 512b to the two bottom tapered sides 516a, 516b.

As shown, the top tip region 520 includes a top blunt tip end 524 having a second width 5W2, and the bottom tip region 522 includes a bottom blunt tip end 526 having a third width 5W3, wherein the third width 5W3 is larger than, the same as, or smaller than the second width 5W2.

The SWG 425 extends from the bottom tip region 522. The adiabatic optical coupler 502 includes a gap 531 between a bottom blunt tip end 526 of the bottom tip region 522 and the SWG 525. Alternatively, the SWG 525 includes the gap 531 between a bottom blunt tip end 526 of the bottom tip region 522 and a first pillar 530 of the SWG 525. As such, either the gap 531 is between the bottom blunt tip end 526 and SWG 525, or the gap 531 is part of the SWG 525. As such, the SWG 525 can include a gap 531 between the bottom blunt tip end 526 and a first pillar 530 of a pillar set 525a. The gap 531 includes a length dimension of about 50 nm to about 200 nm in a longitudinal direction. In some aspects, the pillar set 525a includes at least one rectangular pillar 530a having a rectangular cross-sectional profile in a width, height and/or length planes, such as shown in FIGS. 5B and 5D. In some aspects, the pillar set 525a includes at least one tapered pillar 530 having a trapezoidal cross-sectional profile in the width and length plane as in FIG. 5A. Any of the pillars 530 can have a rectangular cross-sectional profile in the height and length plane and/or width and height plane. Also, the SWG 525 includes a gap 533 between each pillar 530. The gap 533 between each pillar includes a length dimension of about 50 nm to about 200 nm in a longitudinal direction. The gap 533 between each pillar can include a length dimension that is equal to, less than, or greater than a length dimension of the gap 531 between the bottom blunt tip end 526 and the first pillar 530 of the pillar set 525a. In some instances, the gap 531 or gap 533 is air, an optically transmissive material, includes SiN, or includes silicon dioxide.

In some aspects, each pillar 530 of the pillar set 525a has a smaller width than a preceding pillar 530 from the bottom blunt tip end 526 to an opposite pillar 530. The pillar set 525a can include a first pillar 530 adjacent to the bottom blunt tip end 526 that is larger than a second pillar 530, the first pillar 530 being between the bottom blunt tip end 526 and the second pillar 530. The pillar set 525a can include a tapered width profile having sequentially smaller widths from the bottom blunt tip end 526. As such, a first pillar 530 can have a greater width than a second pillar 530. In some aspects, a width of the pillars 530 becomes smaller moving farther away from the bottom blunt tip end 526. Accordingly, a first pillar 530 is wider than a last pillar 530.

In some embodiments, an optically coupled system 500 can include the adiabatic optical coupler 502 and an interposer 150 optically coupled with the adiabatic optical coupler 502. The interposer 150 is a waveguide formed from a member selected from the group consisting of glass, polymer, and SiN. In some aspects, the adiabatic optical coupler 502 is in contact with the interposer 150. In some aspects, the adiabatic optical coupler 502 is adhered with the interposer 150 by an adhesive layer.

A method of manufacturing the adiabatic optic coupler 502 is provided. Such a method can include: forming an optically transmissive body 504; shaping a portion of a top region of the optically transmissive body 504 to form the shape of the top tapered region 506 and to form the shape of the bottom tapered region 508; and shaping a portion of the bottom tapered region 508 of the optically transmissive body 504 to form the SWG 525.

In some aspects, a method of manufacturing the adiabatic optic coupler can include: forming an optically transmissive body 504 having a shape of the bottom tapered region 508; shaping a portion of a top region of the optically transmissive body 504 to form the shape of the top tapered region 506; and shaping a portion of the bottom tapered region 508 of the optically transmissive body 504 to form a subwavelength grating 524 that includes a pillar set 525.

In some embodiments, a method of manufacturing the adiabatic optic coupler 502 can include: forming an optically transmissive body 504; shaping a portion of a top region of the optically transmissive body 504 to form the top tapered region 506; shaping a portion of a bottom region of the optically transmissive body 504 to form the bottom tapered region 508; and shaping a portion of the optically transmissive body 504 to form a subwavelength grating 524 that includes a pillar set 525.

A method of propagating light through an optically coupled system 500 is provided. Such a light propagating method can include: introducing light into the end region 518; propagating the light through the top tapered region 506 and bottom tapered region 508; transitioning at least a portion of the light from the top tapered region 506 to the bottom tapered region 508; propagating the light through the bottom tapered region 508; transitioning the light from the bottom tapered region 508 to the SWG 525; propagating the light through the SWG 525; and transitioning the light from the SWG 525 to an interposer 150.

In some embodiments, a method of propagating light through an optically coupled system 500 can include: introducing light into the end region 518; propagating the light through the top tapered region 506 and bottom tapered region 508 until an effective index of refraction of the top tapered region 506 matches an index of refraction of the bottom tapered region 508; transitioning at least a portion of the light from the top tapered region 506 to the bottom tapered region 508; propagating the light through the bottom tapered region 508; transitioning the light from the bottom tapered region 508 to the SWG 525; propagating the light through the SWG 525 until an effective index of refraction of the SWG 425 matches an index of refraction of the interposer 150; and transitioning the light from the SWG 525 to the interposer 150.

In the methods, a first stage 540 of the top tapered region 506 has a first effective index gradient that changes as a width of the taper 510 changes. In some aspects, a second stage 560 of the bottom tapered region 508 has a second effective index gradient that changes as a width of the bottom tapered region 508 changes. In some aspects, a third stage 570 of the SWG 525 has a third effective index gradient that changes as a width of the SWG 525 changes. The methods may include: transitioning the light from the top tapered region 506 to the bottom tapered region 508 when the effective index of refraction of the top tapered region 506 matches an index of refraction of the bottom tapered region 508; and transitioning the light from the SWG 525 to the interposer 150 when the effective index of refraction of the SWG 525 matches an index of refraction of the interposer 150.

The adiabatic optical couplers can be configured as thin and/or thick Si or SiN waveguide platforms. The adiabatic optical coupler can be thick in a region and thin in a different region as in FIGS. 2A and 5A. Alternatively, the optical coupler can be entirely thin as in FIG. 4A.

In one embodiment, embodiments of the adiabatic optical couplers allow for a wider range of dimensions, such as width, thickness, and length, as well as tapers and partial etch configurations. That is, the present configuration is not limited to thin waveguides (e.g., around 200 nm thickness), but can be much thicker, such as 300 nm or thicker up to 600 nm thickness. The increased dimension also allows for increased width.

For an adiabatic optical coupler that is Si, the thickness (e.g., height) of the first stage at the first end (e.g., inlet side) can range from 150 nm to 500 nm, or from 200 nm to 400 nm, or from 250 nm to 350 nm, or about 300 nm, or any range between these values. Due to the partial etch and removal of a top portion to form the second stage when Si, the thickness (e.g., height) at the second end (e.g., outlet) can be from 25% to 75% of the thickness of the first end of the primary through waveguide, or 33% to 66% of the thickness of the first end of the primary through waveguide, or about 50% of the thickness of the first end of the primary through waveguide. For Si, the width of the adiabatic optical coupler at the first end (e.g., inlet side) can be larger than the thickness, such as at least 125%, 150%, 200%, or 300% larger. Examples of the width of the adiabatic optical coupler at the first end (e.g., inlet side) may range from 200 nm to 1000 nm, or from 300 nm to 800 nm, or from 400 nm to 600 nm, or about 500 nm, or any range between these values.

Figure 5A:
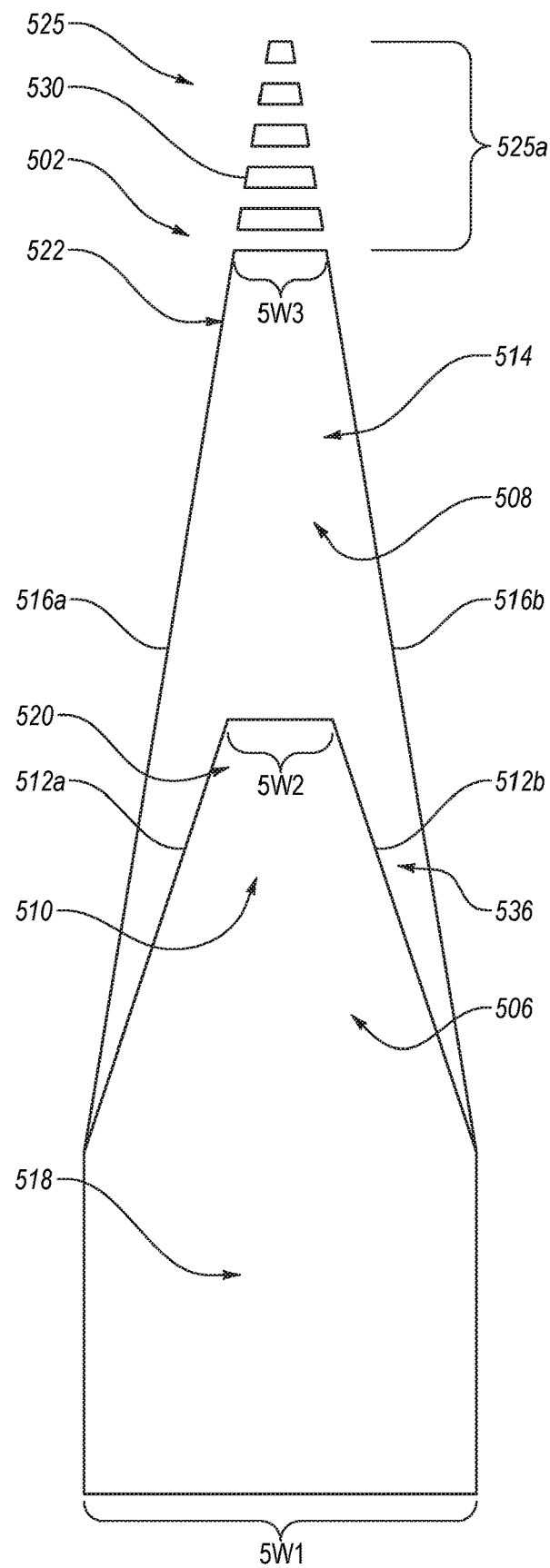
FIGS. 5A-5D include different views that illustrate embodiments of an adiabatic optical coupler.
Figure 5B:
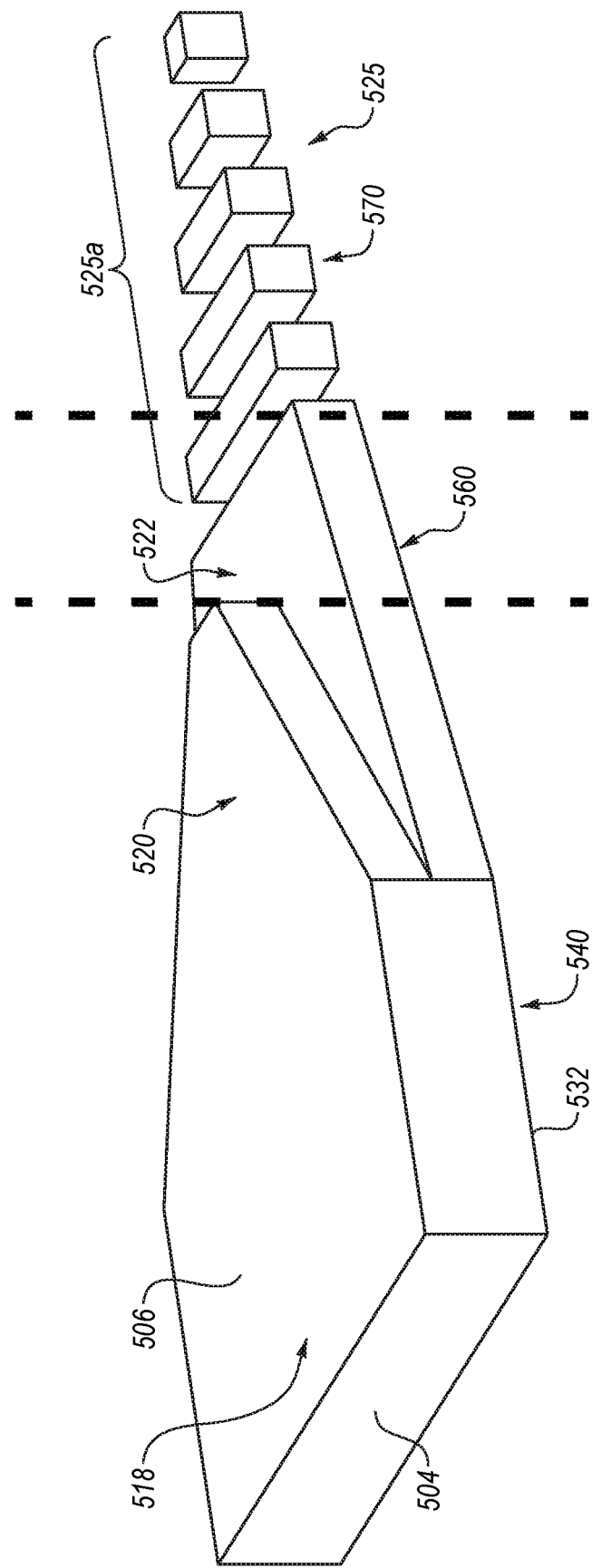
Figure 5C:
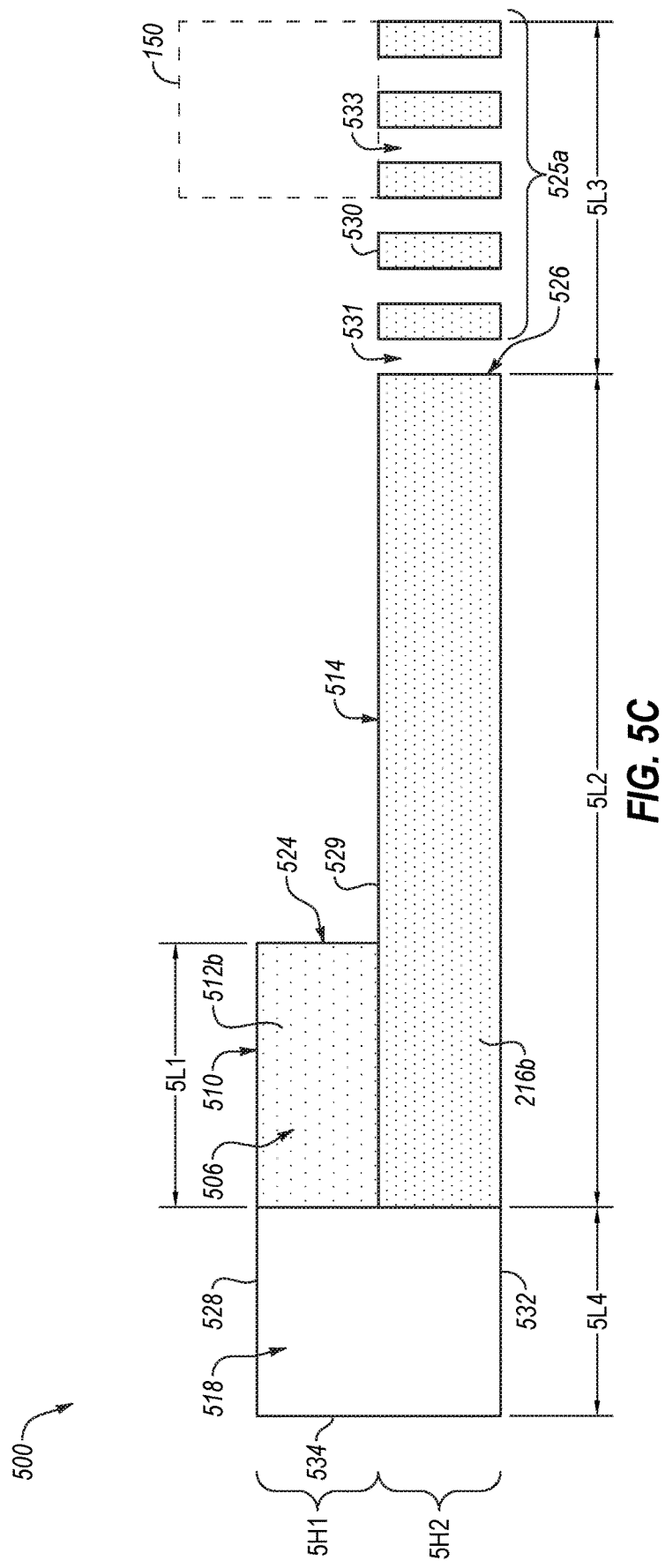
Figure 5D:
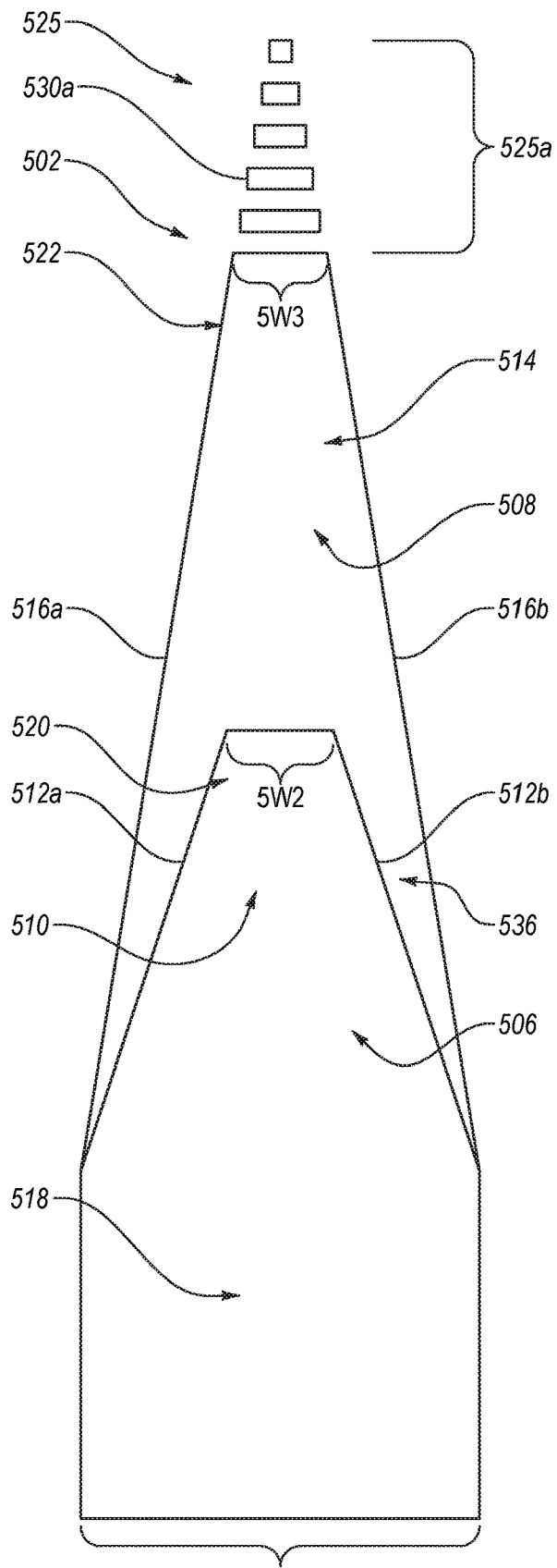

In an example, the thickness (e.g., height) of the etched region in FIG. 2A or 5A or embodiment in FIG. 4A can range from 35 nm to 375 nm, or from 66 nm to 264 nm, or from 75 nm to 200 nm, or about 125 nm, or any range between these values. However, it should be recognized that these are examples and the values may change.

The length of an adiabatic optical coupler can vary based on design. Examples of lengths can be from 0.75 mm to 2.5 mm, 1 mm to 2.25 mm, or 1.75 mm to 2 mm, or around 2 mm. In one option, the length may be as small as 100 to 200 mm, and thereby can range from 100 microns to 2 mm, or 200 microns to 2 mm.

The manufacture of the embodiments of the adiabatic optical coupler can include forming the device in its shape, or forming a block and then shaping it. Such shaping can be by etching. Common to chemical etching, a mask can be used to define the etching part and non-etching part. A mask or other chemical blocking material can be placed on the body defining where the chemical etch will occur. In one example, MOCVD deposition is used to form the body of the adiabatic optical coupler. In one example, the non-etching region is defined by placing a layer of $SiO_2$ everywhere except for leaving the places open that will be etched. Then the $SiO_2$ is removed. After removing the $SiO_2$ then MOCVD coats the body with a higher refractive index material to form the cladding on the adiabatic optical coupler.

Also, the body can be produced with molecular beam epitaxy (MBE). Lower growth temperatures during the MBE can be used to prepare the VCSEL semiconductor layers. The growth of these structures by MBE can be performed at <(less than) 500° C. Comparatively, the temperatures for MOCVD can be >(greater than) 600° C. Additionally, the VCSELs can be prepared by methods that are similar to MBE, such as GSMBE (gas source MBE) and MOMBE (metalorganic MBE) or the like that can produce the regions as described. The formations can be by MOCVD.

With the photoresist still in place, a portion of the body is removed by wet chemical etch. Before etching, the body can have a height or thickness, and after etching can have a height or thickness that is 10%, 25%, 50%, 75%, 80%, or 90% of the height or thickness before etching.

The adiabatic optical coupler can be integrated with a PIC or coupled therewith.

In some embodiments, the index of refraction of the adiabatic optical coupler is reduced by the tapered portions of the body as shown. When the index of refraction of the adiabatic optical coupler is low enough to be comparable to the interposer waveguide, then there is good adiabatic coupling so that most all of the light goes into the interposer. As shown, the adiabatic optical coupler can have a taper to a smaller tip size The adiabatic optical coupler can have two stages, or it can have three stages as shown herein. Based on the designs herein, the tapers of each embodiment of the adiabatic optical coupler can include a tip with a width of about 150 nanometer or thereabout or the values provided herein, which allows for the light to couple into the interposer. In FIG. 2A, the thick portion can be about 300 nm, and the thin portion can be about 150 nm. In FIG. 4A, the entirety can be about 150 nm. In FIG. 5A, the thick portion can be about 300 nm, and the thin portion, including the SWG 525, can be about 150 nm in height. As such, the thick portions can be the thicker dimensions described herein and the thin portions can be the thinner dimensions described herein.

The adiabatic optical coupler can be configured such that the index of refraction of the outlet of the first stage can be about the same as the index of refraction of the inlet of the second stage. The outlet of the second stage can have an index of refraction of an inlet of the interposer. The outlet is where the light transitions from one stage to the next.

In a three stage embodiment, the index of refraction of the outlet of the second stage can be about the same as the index of refraction of the inlet of the third stage. The outlet of the third stage can have an index of refraction that is about the same as the index of refraction of the interposer. Thus, each stage can have an index of refraction gradient from an optical inlet side to the optical outlet side of that stage. This allows the index of refraction of an outlet to match the index of refraction of the next inlet with respect to the passage of light from one stage to the next stage or interposer. The light can be in some sort of hybrid mode at or during the transition from one stage to the next stage or to the interposer.

Figure 7:
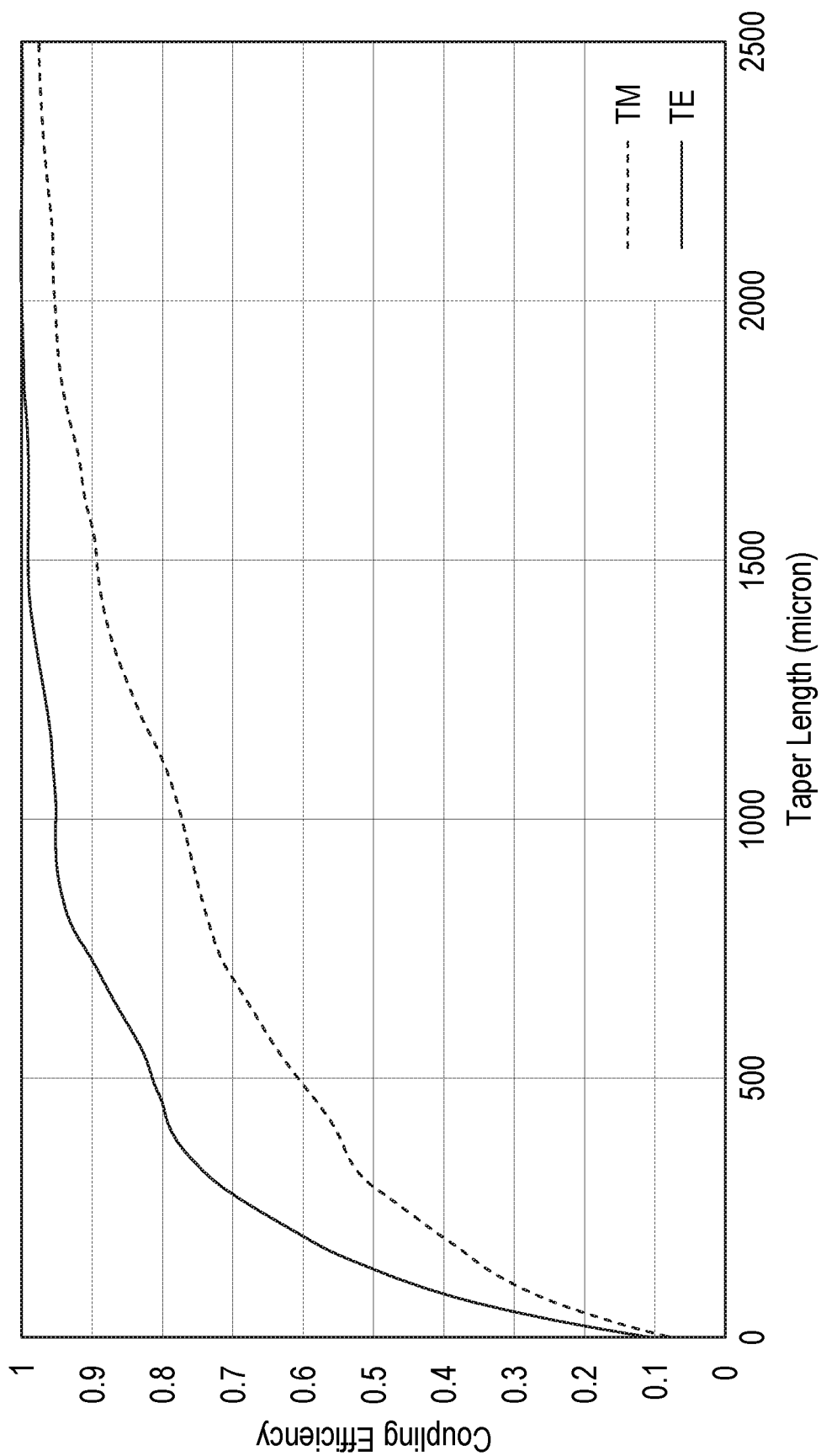
FIG. 7 includes a graph of data that shows the coupling efficiency for TE and TM for the taper length for the embodiment in FIG. 2A.

With reference to FIG. 6, it is shown that the taper of the embodiment in FIG. 2A can reduce the effective index of refraction until it matches the next stage or the interposer. FIG. 7 shows the coupling efficiency for TE and TM for the taper length for the embodiment in FIG. 2A. Here, the tip width of the taper can be a minimum of 80 nm with a thickness of 165 nm (e.g., second stage). The coupling efficiency for both TE and TM can be 97% with a taper length of greater than 2.5 mm, and may vary from 2 mm to 2.75 mm, or 2 mm to 2.25 mm.

While the taper is shown to have flat etched faces that form the taper, the tapered face can be flat, concave, convex, or have complex shapes.

With regard to the SWG 425, 525, the gap between pillars can be smaller than the effective index, or smaller than ($\lambda$/2n)=effective index. The longitudinal length of the pillars can be the same as the dimension of the gap between the pillars, or it can be longer or shorter.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

The invention claimed is:

1. An adiabatic optical coupler comprising:
a top tapered region that includes a top taper having two top tapered sides that taper from a first end region to a top tip region, the top taper having a first length; and
a bottom tapered region under the top tapered region, wherein the bottom tapered region includes a bottom taper having two bottom tapered sides that taper from the first end region to a bottom tip region, the bottom taper having a second length that is longer than the first length,
wherein a first stage including the top and bottom tapered regions that extends from the first end region to about the top tip region has a first effective index gradient that changes as a top width of the top taper changes, and
wherein a second stage including the bottom tapered region that extends from the top tip region to the bottom tip region has a second effective index gradient that changes as a bottom width of the bottom taper changes.

2. The adiabatic optical coupler of claim 1, wherein the top tapered region is integrated with the bottom tapered region as a unitary optically transmissive body.

3. The adiabatic optical coupler of claim 1, wherein the top tapered region is a body coupled with a body the bottom tapered region.

4. The adiabatic optical coupler of claim 1, wherein the top tip region terminates in a first blunt width; and wherein the bottom tip region terminates in a second blunt width being the same as or different from the first blunt width.

5. The adiabatic optical coupler of claim 1, wherein the first effective index gradient is different from the second effective index gradient.

6. The adiabatic optical coupler of claim 1, wherein the top taper is over a portion of the bottom taper adjacent to the first end region, and another portion of the bottom taper adjacent to the bottom tip region is devoid of the top taper thereover.

7. An optically coupled system, comprising:
the adiabatic optical coupler of claim 1; and
an interposer optically coupled with the adiabatic optical coupler.

8. A method of propagating light through the adiabatic optical coupler to the interposer of the optically coupled system of 7, the method comprising:
introducing light into the first end region of the adiabatic optical coupler;
propagating the light through the top tapered region and bottom tapered region;
transitioning at least a portion of the light from the top tapered region to the bottom tapered region;
propagating the light through the bottom tapered region; and
transitioning the light from the bottom tapered region to the interposer.

9. A method of manufacturing the adiabatic optic coupler of claim 1, the method comprising:
forming an optically transmissive body;
shaping a portion of a top region of the optically transmissive body to form the top tapered region; and
shaping a portion of a bottom region of the optically transmissive body to form the bottom tapered region.

10. An optical system comprising:
the optically coupled system of claim 7; and
a photonic integrated circuit (PIC) optically coupled to the adiabatic optical coupler.

11. An adiabatic optical coupler comprising:
a tapered region that includes a taper having two tapered sides that taper from an end region to a tip region; and
a sub-wavelength grating (SWG) optically coupled with the tip region.

12. The adiabatic optical coupler of claim 11, further comprising a first gap between a blunt tip end of the tip region and a first pillar of the SWG, and wherein the SWG includes a pillar set that includes at least two spaced apart pillars with a second gap between each pillar.

13. The adiabatic optical coupler of claim 12, wherein the pillar set includes at least one rectangular pillar having a rectangular cross-sectional profile in a width, height and/or length planes.

14. The adiabatic optical coupler of claim 12, wherein the pillar set includes at least one tapered pillar having a trapezoidal cross-sectional profile in the width and length plane.

15. The adiabatic optical coupler of claim 14, wherein the at least one tapered pillar has a rectangular cross-sectional profile in the height and length plane and/or width and height plane.

16. The adiabatic optical coupler of claim 11, further comprising:
a first stage that includes the tapered region; and
a second stage that includes the SWG,
wherein the first stage has a first effective index gradient that changes as a first width of the taper changes; and
wherein the second stage has a second effective index gradient that changes as a second width of the SWG changes.

17. The adiabatic optical coupler of claim 16, wherein the first effective index gradient is different from the second effective index gradient.

18. An optically coupled system comprising:
the adiabatic optical coupler of claim 11; and
an interposer optically coupled with the adiabatic optical coupler.

19. A method of propagating light through the optically coupled system of claim 18, the method comprising:
introducing light into the end region of the adiabatic optical coupler;
propagating the light through the tapered region;
transitioning the light from the tapered region to the SWG;
propagating the light through the SWG; and
transitioning the light from the SWG to the interposer.

20. A method of manufacturing the adiabatic optic coupler of claim 11, the method comprising:
forming an optically transmissive body;
shaping the optically transmissive body to form the tapered region; and shaping a portion of the tapered region of the optically transmissive body to from the pillar set.

21. An adiabatic optical coupler comprising:
  a top tapered region that includes a top taper having two top tapered sides that taper from a first end region to a top tip region, the top taper having a first length;
  a bottom tapered region under the top tapered region, wherein the bottom tapered region includes a bottom taper having two bottom tapered sides that taper from the first end region to a bottom tip region, the bottom taper having a second length that is longer than the first length; and
  a sub-wavelength grating (SWG) optically coupled with the bottom tip region.

22. The adiabatic optical coupler of claim 21, wherein the adiabatic optical coupler includes:
  a first stage that includes the top tapered region and bottom tapered region that extends from the first end region to about the top tip region;
  a second stage that includes the bottom tapered region that extends from the top blunt tip end to the bottom tip region; and
  a third stage includes the SWG, wherein: the first stage has a first effective index gradient that changes as a first width of the top taper changes; the second stage has a second effective index gradient that changes as a second width of the bottom taper changes; and the third stage has a third effective index gradient that changes as a third width of the changes.

23. The adiabatic optical coupler of claim 21, wherein the top taper is over a portion of the bottom taper adjacent to the first end region, and another portion of the bottom taper adjacent to the bottom tip region is devoid of the top taper there over.

24. The adiabatic optical coupler of claim 23, further comprising a gap between a bottom blunt tip end of the bottom tip region and a first pillar of the SWG.

25. The adiabatic optical coupler of claim 21, wherein the SWG includes a pillar set, wherein the pillar set includes a plurality of spaced apart pillars with gaps between adjacent pillars.

26. The adiabatic optical coupler of claim 25, wherein the pillar set includes at least one rectangular pillar having a rectangular cross-sectional profile in a width, height and/or length planes.

27. The adiabatic optical coupler of claim 25, wherein the pillar set includes at least one tapered pillar having a trapezoidal cross-sectional profile in the width and length plane, wherein the at least one tapered pillar has a rectangular cross-sectional profile in the height and length plane and/or width and height plane.

28. The adiabatic optical coupler of claim 25, wherein each gap is air, an optically transmissive material, includes SiN, or includes silicon dioxide.

29. The adiabatic optical coupler of claim 25, wherein each pillar of the pillar set has a smaller width than a preceding pillar from the bottom blunt tip end to an opposite pillar.

30. A method of manufacturing the adiabatic optic coupler of claim 21, the method comprising:
  forming an optically transmissive body;
  shaping a portion of a top region of the optically transmissive body to form the shape of the top tapered region and to form the shape of the bottom tapered region; and
  shaping a portion of the bottom tapered region of the optically transmissive body to form the SWG.

31. An optically coupled system comprising:
  the adiabatic optical coupler of claim 21; and
  an interposer optically coupled with the adiabatic optical coupler.

32. A method of propagating light through an optically coupled system of claim 31, the method comprising:
  introducing light into the end region of the adiabatic optical coupler;
  propagating the light through the top tapered region and bottom tapered region;
  transitioning at least a portion of the light from the top tapered region to the bottom tapered region; propagating the light through the bottom tapered region;
  transitioning the light from the bottom tapered region to the SWG;
  propagating the light through the SWG; and
  transitioning the light from the SWG to the interposer.

33. The method of claim 32, further comprising:
  transitioning the light from the top tapered region to the bottom tapered region at a location where an effective index of refraction of the top tapered region matches an index of refraction of the bottom tapered region; and
  transitioning the light from the SWG to the interposer at a location where the effective index of refraction of the SWG matches an index of refraction of the interposer.

* * * * *